(12) United States Patent
Dravneek et al.

(10) Patent No.: US 10,164,855 B2
(45) Date of Patent: Dec. 25, 2018

(54) SYSTEM FOR DYNAMICALLY MANAGING RESOURCE CONNECTIVITY

(71) Applicant: Bank of America Corporation, Charlotte, NC (US)

(72) Inventors: Victoria L. Dravneek, Charlotte, NC (US); Katherine Dintenfass, Lincoln, RI (US); Robert S. Kerr, Charlotte, NC (US); Jason Christian Karmelek, Mendon, MA (US)

(73) Assignee: Bank of America Corporation, Charlotte, NC (US)

( * ) Notice: Subject to any disclaimer, the term of this patent is extended or adjusted under 35 U.S.C. 154(b) by 177 days.

(21) Appl. No.: 15/433,818

(22) Filed: Feb. 15, 2017

(65) Prior Publication Data

US 2018/0234317 A1  Aug. 16, 2018

(51) Int. Cl.
*G06F 15/173* (2006.01)
*H04L 12/26* (2006.01)
*H04L 12/911* (2013.01)

(52) U.S. Cl.
CPC ........ *H04L 43/0876* (2013.01); *H04L 43/045* (2013.01); *H04L 47/82* (2013.01)

(58) Field of Classification Search
CPC .... H04L 43/045; H04L 43/0876; H04L 47/82
See application file for complete search history.

(56) References Cited

U.S. PATENT DOCUMENTS

| | | | |
|---|---|---|---|
| 5,950,193 A | 9/1999 | Kulkarni | |
| 6,819,919 B1 | 11/2004 | Tanaka | |
| 8,249,995 B2 | 8/2012 | Sheperd | |
| 8,433,713 B2 | 4/2013 | Chen et al. | |
| 8,543,515 B2 | 9/2013 | McGovern et al. | |
| 8,612,359 B2 | 12/2013 | Hull et al. | |
| 8,977,618 B2 | 3/2015 | Chen et al. | |
| 9,390,422 B2 | 7/2016 | Toomey | |
| 2002/0194112 A1 | 12/2002 | dePinto et al. | |
| 2003/0060214 A1 | 3/2003 | Hendrey et al. | |
| 2003/0084051 A1 | 5/2003 | Depura et al. | |

(Continued)

OTHER PUBLICATIONS

GoGig, Find Work, retrieved from the internet at https://www.gogig.com/work on Feb. 15, 2017; 7 pages.

*Primary Examiner* — Mohamed A Wasel
(74) *Attorney, Agent, or Firm* — Michael A. Springs; Moore & Van Allen PLLC; Nicholas C. Russell

(57) ABSTRACT

A system may be configured for: identifying a plurality of resource deficiencies associated with a first plurality of users; constructing a resource deficiency object repository comprising a plurality of resource deficiency objects associated with the plurality of resource deficiencies; determining a resource provisioning capability associated with the second user; constructing a resource provisioning object associated with the resource provisioning capability of the second user; determining that the resource provisioning capability associated with the second user matches a first resource deficiency associated with the first user; establishing, automatically, a resource connection between the first resource deficiency object and the resource provisioning object and initiating transfer of resources corresponding to the resource provisioning capability associated with the second user to the first user.

20 Claims, 3 Drawing Sheets

(56) References Cited

U.S. PATENT DOCUMENTS

| | | |
|---|---|---|
| 2003/0182171 A1 | 9/2003 | Vianello |
| 2005/0055306 A1 | 3/2005 | Miller et al. |
| 2006/0106774 A1* | 5/2006 | Cohen .................... G06Q 30/06 |
| 2006/0155636 A1 | 7/2006 | Hermann et al. |
| 2011/0099119 A1 | 4/2011 | Kwiat et al. |
| 2011/0145556 A1* | 6/2011 | Hakoun .................. G06F 1/266 |
| | | 713/1 |
| 2011/0208664 A1 | 8/2011 | Rahman |
| 2012/0084342 A1* | 4/2012 | Brown ............... H04N 21/2543 |
| | | 709/203 |
| 2012/0239585 A1 | 9/2012 | Bailey |
| 2012/0264098 A1 | 10/2012 | Megargel et al. |
| 2013/0060651 A1 | 3/2013 | Konduri |
| 2015/0227632 A1 | 8/2015 | Lunardi et al. |
| 2015/0339631 A1 | 11/2015 | Hodges |
| 2016/0239806 A1 | 8/2016 | Benham et al. |
| 2016/0300191 A1 | 10/2016 | Leslie |
| 2016/0307160 A1 | 10/2016 | Khasnis et al. |

\* cited by examiner

SYSTEM FOR DYNAMICALLY MANAGING RESOURCE CONNECTIVITY

FIELD OF THE INVENTION

The present invention embraces a computerized system for identifying and correlating resource deficiencies and resource provisioning capabilities.

BACKGROUND

With the proliferation of Internet technology in recent times, people may utilize online systems to connect with other users or access resources. Conventional methods may include using online website postings to coordinate the users and resources. That said, there are a number of technical problems with using conventional online systems in this manner. In particular, current systems require the users to constantly sift through postings to determine what is relevant and not relevant, thereby leading to inefficiencies of computing resources such as processing power, memory, and network bandwidth.

Accordingly, there is a need for a more efficient and dynamic way to connect users and resources with one another.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In one aspect, the present invention embraces a computerized system, and an associated computerized method and computer program product, for dynamically managing resource. The system typically includes a processor, a memory, and a communication device in communication with a plurality of user devices of a plurality of users over a network. The plurality of user devices may include a first user device of a first user and a second user device of a second user. The system also typically includes a resource management module stored in the memory and executable by the processor. In one embodiment, the resource management module is configured for: identifying a plurality of resource deficiencies associated with a first plurality of users of the plurality of users, wherein each resource deficiency of the plurality of resource deficiencies is associated with a resource deficiency parameter; constructing a resource deficiency object repository comprising a plurality of resource deficiency objects associated with the plurality of resource deficiencies, wherein constructing the resource deficiency object repository comprises: constructing for each of the plurality of resource deficiencies, a resource deficiency object based on at least the resource deficiency parameter, wherein the resource deficiency object is configured for selection within the resource deficiency object repository based on the resource parameter; determining a resource provisioning capability associated with the second user, wherein the resource provisioning capability of the second user is associated with a resource provisioning parameter; constructing a resource provisioning object associated with the resource provisioning capability of the second user based on at least the resource provisioning parameter; parsing the resource deficiency object repository to identify a first resource deficiency object of the plurality of resource deficiency objects having a first resource deficiency parameter that corresponds to the resource provisioning parameter, wherein the first resource deficiency object is associated with a first resource deficiency of the first user of the first plurality of users; determining that the resource provisioning capability associated with the second user matches the first resource deficiency associated with the first user, based on identifying that the first resource deficiency parameter corresponds to the resource provisioning parameter; based on determining that the resource provisioning capability associated with the second user matches a first resource deficiency of the first user, establishing, automatically, a resource connection between the first resource deficiency object and the resource provisioning object, comprising appending the first resource deficiency object with the resource provisioning object, wherein establishing the resource connection further comprises notifying the first user, via the first user device of the first user, regarding the resource connection; receiving an indication from the first user, via the first user device, accepting the resource connection; and initiating transfer of resources corresponding to the resource provisioning capability associated with the second user to the first user.

In some embodiments, or in combination with the previous embodiments, the system is further configured for: establishing a secure communication channel with a client application stored on the first user device of the first user; and transmitting, over the secure communication channel, a first command to the client application, wherein the first command is configured to cause the client application to present a first interface on the first user device, wherein the first interface comprises a first graphical element associated with the first resource deficiency object on the first interface.

In some embodiments, or in combination with any of the previous embodiments, wherein establishing a resource connection further comprises: transmitting, over the secure communication channel, a second command to the client application, wherein the second command is configured to cause the client application to present an augmented interface on the first user device, wherein the augmented interface comprises the first graphical element augmented with a second graphical element associated with the resource provisioning object, wherein the second graphical element comprises a presentation of the resource provisioning parameter on the first interface; wherein receiving an indication from the first user accepting the resource connection comprises monitoring action of user within the client application, in real-time, over the secure communication channel, to identify a selection of the second graphical element by the user within the client application.

In some embodiments, or in combination with any of the previous embodiments, the system is further configured for: establishing a secure communication channel with a client application stored on the first user device of the first user; transmitting, over the secure communication channel, a command to the client application, wherein the command is configured to cause the client application to present a first interface on the first user device, wherein the first user interface comprises a graphical element associated with the resource provisioning object comprising the resource provisioning parameter and the resource connection; receiving, over the secure communication channel, a feedback input from the first user; modifying the resource provisioning object associated with the resource provisioning capability of the second user by augmenting the resource provisioning object with the feedback input from the first user.

In some embodiments, or in combination with any of the previous embodiments, the system is further configured for: determining a second resource provisioning capability associated with the second user, wherein the second resource provisioning capability of the second user is associated with a second resource provisioning parameter; modifying the resource provisioning object associated with the resource provisioning capability of the second user by augmenting the resource provisioning object with the second resource provisioning parameter.

In some embodiments, or in combination with any of the previous embodiments, the system is further configured for: monitoring, in real-time, over a secure communication channel, actions of the first user within a client application; based on monitoring the actions of the first user within the client application, predicting the first resource deficiency of the first user; and in response to predicting the first resource deficiency, transmitting, over the secure communication channel, a command to the client application, wherein the command is configured to cause the client application to display an interface for constructing the first resource deficiency object associated with the first resource deficiency.

In some embodiments, or in combination with any of the previous embodiments, wherein monitoring the actions of the first user within the client application comprises tracking the first user's mouse cursor position, touchscreen inputs, key strokes, or time accessing a particular interface of the client application.

In some embodiments, or in combination with any of the previous embodiments, wherein the resource provisioning capability of the second user is determined based on one or more past resource provisioning objects associated with the second user.

In some embodiments, or in combination with any of the previous embodiments, wherein the resource provisioning capability of the second user is determined based on receiving an input from the second user regarding the resource provisioning capability.

In some embodiments, or in combination with any of the previous embodiments, the system is further configured for: constructing a resource provisioning object repository comprising a plurality of resource provisioning objects associated with a plurality of resource provisioning capabilities, wherein the plurality of resource provisioning objects comprises the resource provisioning object associated with associated with the resource provisioning capability of the second user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
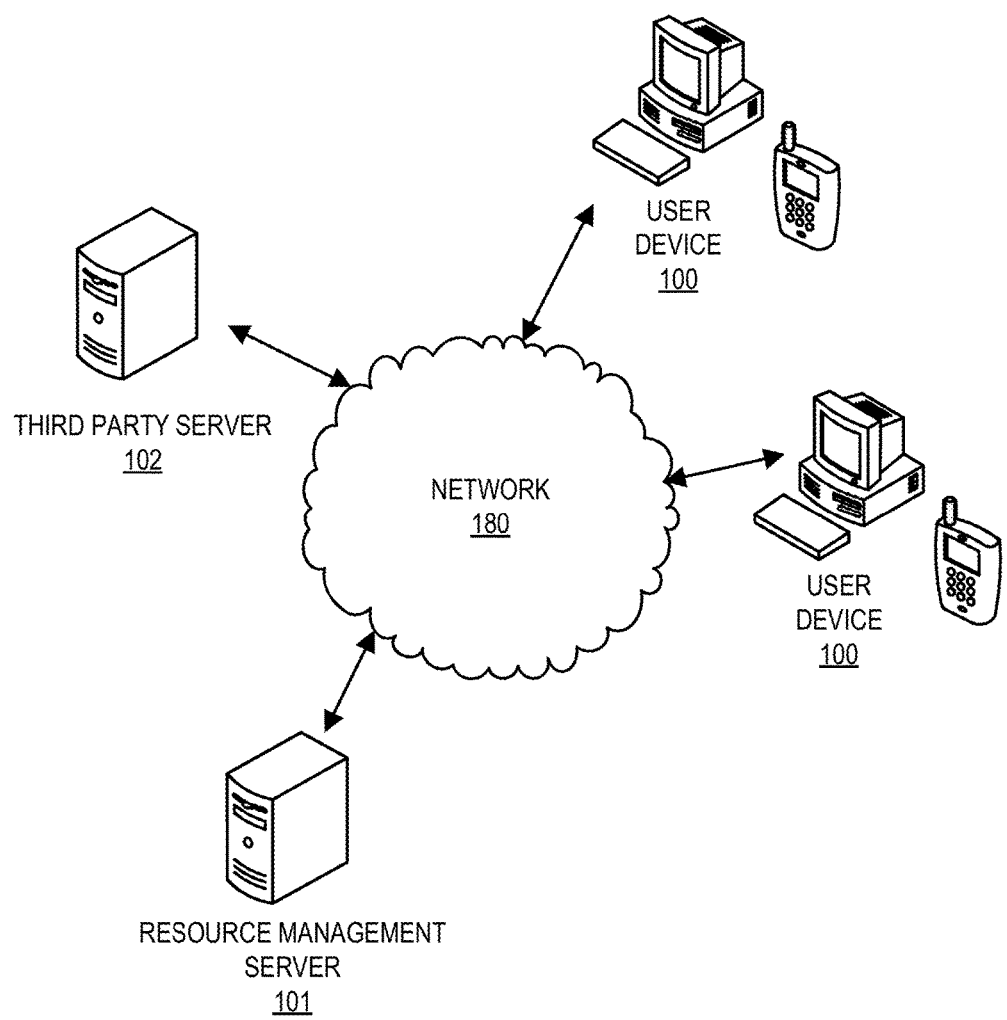
Figure 2:
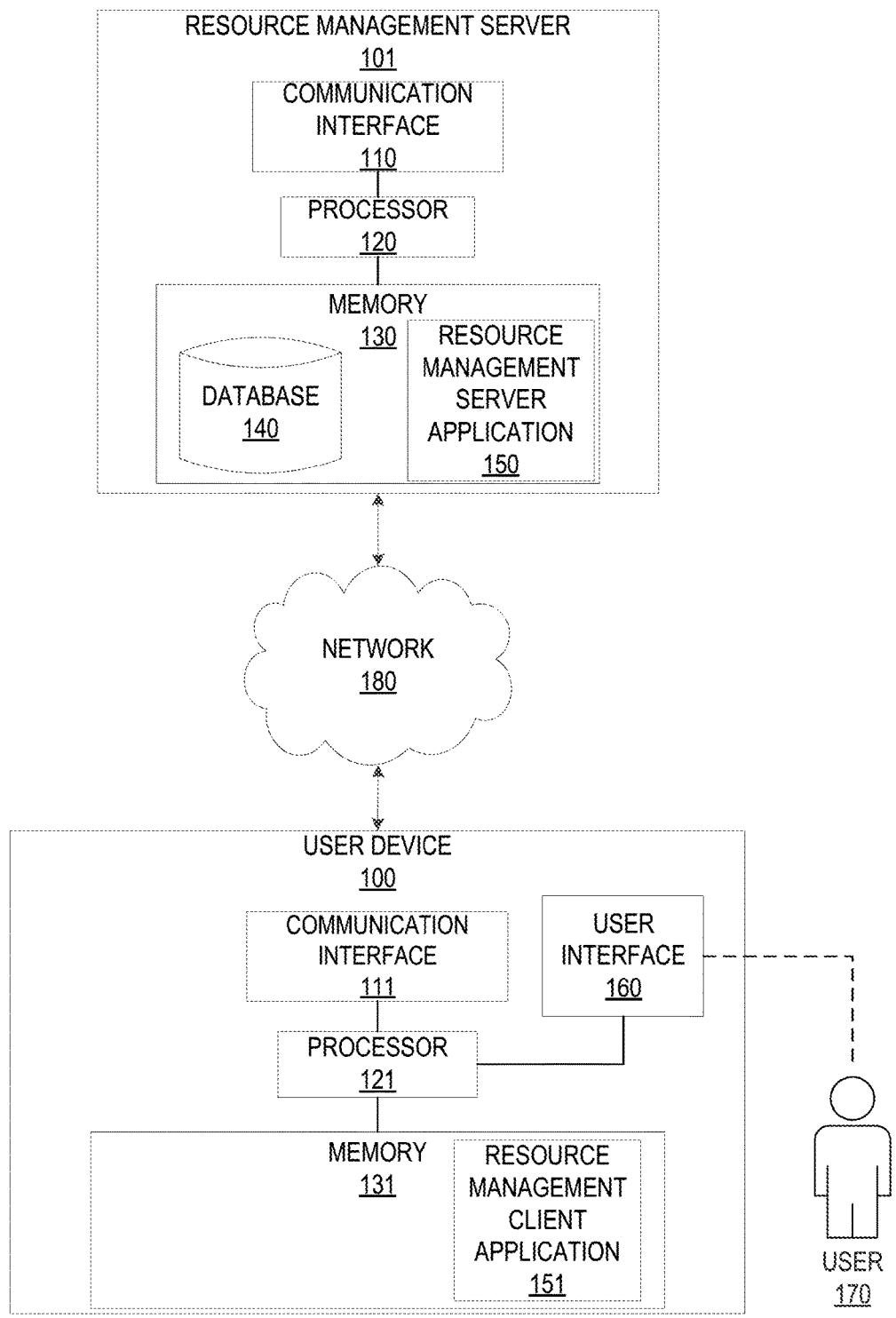
Figure 3:
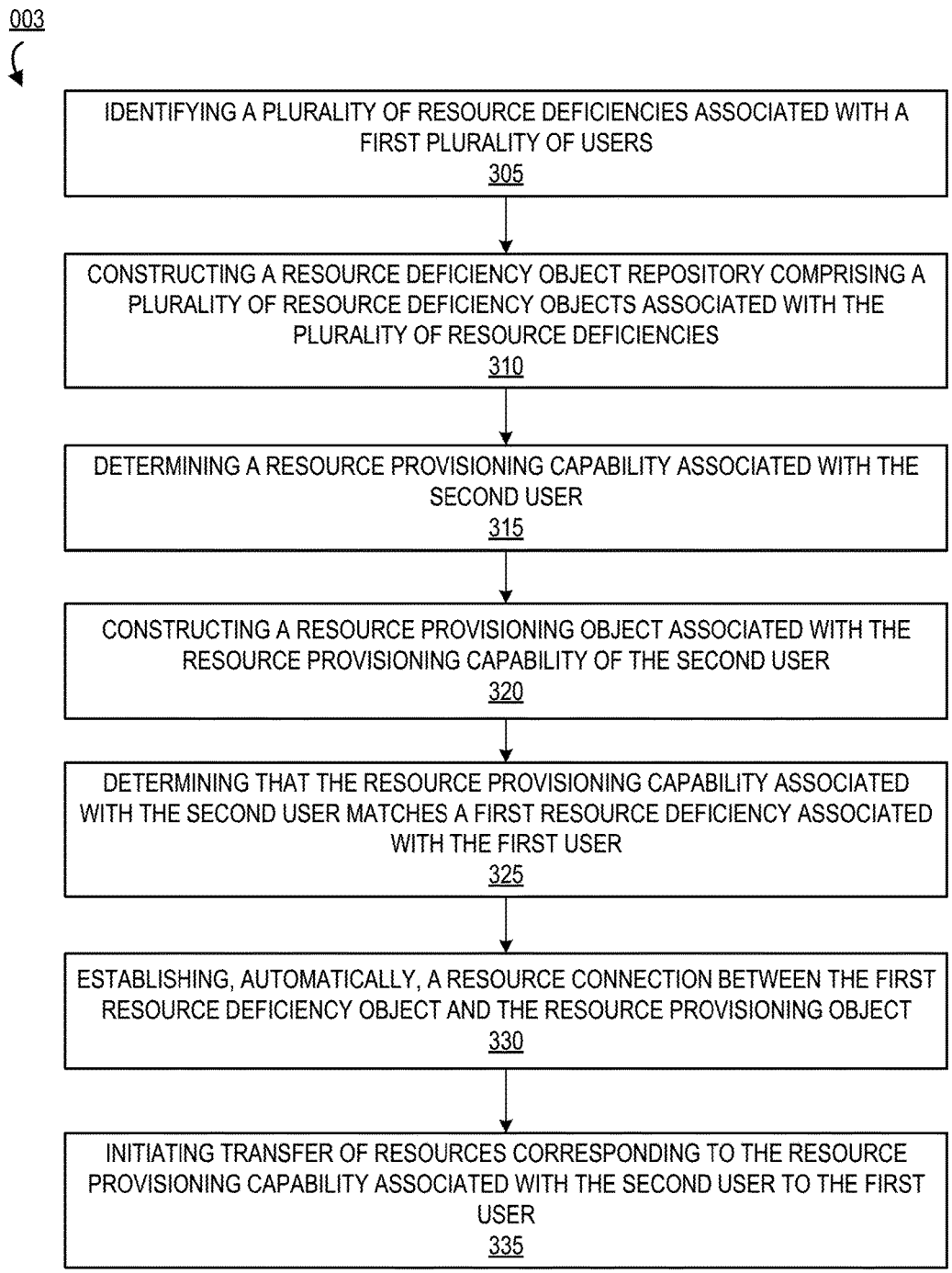

Having thus described embodiments of the invention in general terms, reference will now be made to the accompanying drawings, wherein:

FIG. 1 depicts an operating environment, in accordance with one embodiment of the present invention;

FIG. 2 depicts a schematic of a user device and a resource management server, in accordance with one embodiment of the present invention; and FIG. 3 depicts a method for dynamically managing resource connectivity, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"User" as used herein may refer to an individual or entity that utilizes a system for identifying, pooling, and managing resources as described herein. In some embodiments, the user may be a representative of a business entity. In other embodiments, the user may be an independent contractor who is looking to offer a resource to other users in the system. For instance, a user may be a participant who wishes to offer services and goods to the other users within the system. To this end, another the user may be a participant who wishes to obtain services or goods from the users within the system. In this way, the system connects users together so that they may efficiently exchanges resources with one another.

"Entity" as used herein may refer to an individual or an organization that owns and/or operates the resource management systems and the associated computing systems. The entity may be a business organization (e.g., a financial institution), a non-profit organization, a government organization, and the like.

"User device" as used herein may refer to a computing device used by the user to access the system through an online portal. The user device may include a processor, a non-transitory storage medium, a communications device, and a display. The system may support user logins and inputs from any combination of disparate devices. Accordingly, the user device may be a portable electronic device such as a smartphone, tablet, or laptop, or the user device may be a stationary unit such as a personal desktop computer or a networked terminal within an entity's premises.

"Resource" as used herein may refer to a property of the user over which the user exercises control, or an asset belonging to the user. For instance, a resource may refer to a particular good or service which the user may wish to provide to or obtain from other users. The resource may further refer to intangible assets, such as a user's credentials.

"Resource data" as used herein may refer to a data structure that is associated with a particular resource. Resource data is identified, manipulated, or classified by the system, and may include various types of information upon which the system performs its various functions. In some embodiments, the information may include an offer to sell goods or services. In other embodiments, the information may include a request for goods or services. The information may further include location data, pricing data, or time data. The information may further include an identity of a user or various characteristics or statistics of the user.

"Classification" as used herein refers to a status attributed to resource data by the system in order to provide for organization or grouping of the resources. In some embodiments, resources may be classified by "likeness," or by certain similar characteristics inherent to the resource. In some embodiments, resources may also be classified according to links established by the system's user base, independently of the "likeness" of the resources within such a classification. In this way, the system may intelligently provide recommendations of resources to the user even if the relevance of such resources to the user is not immediately evident. Classifications for resources may be stored in a classifications database, and may include a unique fixed-length string to identify the classification. The fixed-length string may be a numerical value such as "8251," a cryptographic hash, or a plain-text description of the classification, such as "Linux drivers."

Embodiments of the present invention provide a system for identifying and pooling resources, as well as tools that enable users to manage the pooled resources. In particular, the system may identify resource data provided by an authenticated user and assign a classification to the resource based on the data type. The system may further create logical links between and amongst the resources provided by all authenticated users within the system according to their respective classifications, grouping like resources or related resources together. Resources may be assigned to one or more classifications and may be "tagged" for later identification and retrieval by the system based on the data contained within the resources. For example, the system may classify resources according to various criteria, such as data file types, key words or phrases, upload date, geographic restrictions, and the like. The system may then provide the aggregated data to the user for further processing and input. In some embodiments, the classifications for particular resources and logical links between particular resources may be stored in a classifications database. The system may further provide classifications for users based on the types of resource data they upload or access. For instance, a user may be classified according to certain criteria, such as skillsets, geographic location, areas of expertise/profession, and the like. In this way, the system may build a profile of a user based on the user's numerous classifications, and accordingly recommend certain resources according to the logical links created amongst the user and the resources.

The system may include a data collection module which tracks inputs from users on a real-time basis, where the inputs may be resource data or requests for resources. In some embodiments, the system may further include a data analytics engine that, based on both historical data and data provided by the users in real time, predicts future subsequent actions or inputs by the user based on the resource data provided by the user or actions taken by the user, and provide suggestions of potential resources or portal tools of interest to the user. Such historical data may be stored on a long-term basis in a user input database. By calculating predictions and providing resource or tool suggestions, the system prevents the need for the user to manually seek out resources related to one's interest. For instance, in one embodiment of the invention, a user may upload a file including a sample of source code to the system. The system may detect that the file includes source code, and based on the contents of the source code therein, the system may make a number of recommendations to the user. The system may make this determination, for example, by reading the contents of the source code, such as the types of functions used, the programming language used, and the software libraries incorporated within the code. In response, the system may provide a listing of additional project opportunities that may be suitable to the user. The system may also provide a list of users within the system who could serve as collaborators on a given coding project, which the system identifies by detecting that the users have worked on similar projects in the past. In other embodiments, a user may upload a posting to provide goods or services, where the posting includes data of various file types and may include images, videos, text, and the like. The system may characterize the data within the posting by analyzing it for image or video metadata, or keywords. Based on this analysis, the system may then dynamically provide the user with a number of suggestions for resources that are related to the posting, which may include other users who are potentially interested in the good or service offered, or a suggestion to purchase a material that is necessary to provide the service. In some embodiments, the system may provide rewards to users who exchange resources to other users through the system. In some embodiments, the system may analyze user data (e.g., historic transaction data) to assess the likelihood that a particular user may be unable to or otherwise fail to pay for resources purchased through the system, deliver resources purchased by others through the system, deliver satisfactory resources, and the like. This information may be provided to other users of the system. In addition, the system may guarantee a user payment from another user through the system (e.g., to purchase goods or services from the user) and/or the delivery or quality of a resource purchased through the system. Accordingly, in the event the user does not receive a payment or a resource or the quality of a resource is deficient, the system may compensate the user.

In some embodiments, the system may include an online portal which serves as the interface between the system and the users. The system may run its processes on a server or network of servers which users may access using a computing device. In some embodiments, the system may provide to the user a client application or program which is used to access the server-side application over a network. The online portal may present a graphical interface to the display of the user device, through which the user may select from a number of tools and functions provided by the system. For instance, the system may provide tools to pool resources with or amongst users within the system.

The graphical interface may include a number of panels which may receive inputs or display information to the user. For example, the graphical interface may include a resource input panel, which allows the user to upload resource data into the system. The resource input panel may contain buttons or areas that receive user input related to the resources, such as a text entry box, or a sub-panel through which the user may upload various media files to the system. The graphical interface may further include a resource listing panel, which contains a list of resources sorted by its classification. The resource listing panel may also contain various filters to allow the user to change the number and order of resources listed on the screen at once according to certain criteria, such as upload date, classification, resource contents, popularity, and the like. In this way, the resource listing panel allows the user to effectively browse through the resources uploaded to the system.

The graphical interface may also include a notifications panel, through which the system provides resource recommendations to the user. The resource recommendations displayed in the notifications panel may further contain a selectable link which the user may use to directly access the suggested resource. In some embodiments, the graphical interface may include a resource information panel, which provides a user with statistical data about a selected resource by comparing the user-inputted resource data with like resources data provided by other users within the system. For example, the user may upload a posting to provide a particular good for a particular price. The system may recognize that the posting includes an offer to provide a particular good, identify the classification of the particular good, and retrieve statistical pricing data for the particular good. The system may then provide this data to the user through the resource information panel, and may further provide a pricing suggestion for the good to be provided.

In some embodiments, the system may dynamically track usage data through the resource management application on the user device. In particular, the resource management application may track user inputs, such as mouse cursor positions, touchscreen inputs, key strokes, and the like. The system may establish a secure communication channel with the resource management application or other client application on the user device in order to obtain real-time usage data of the user's actions within the application. Based on these user inputs as well as historical data and the user's attributes/classification(s) (and attributes/classification(s) of resources of the user), the system may predict future actions that the user intends to take (e.g., within a client application) and make recommendations according to the predictions. For instance, the system may track the length of time and level of activity with which the user spends viewing data relating to a particular resource. In such an embodiment, the system may gauge the duration that a user spends viewing a posting for a good or service, and track whether the user has opened any attachments associated with the posting, such as images or videos. In this way, the system may estimate the level of interest in a particular resource by a particular user and assign a "relevance score" to the classification of the particular resource. The system will consider higher relevance scores to represent resources that are more relevant to a user. Subsequently, the system may then provide a list of potentially relevant resources in the notifications panel, which may be populated with references sorted by their relevance score or classification, e.g. users of classification A are typically interested in resources of classifications B, C, and D.

In some embodiments, rather than or in addition to providing suggestions, the data analytics engine may, based on tracking a user's inputs, the user's attributes, resource attributes, historical data, and the like, dynamically predict subsequent actions that the user intends to take within the client application, graphical interface or otherwise when interacting with the resource management system. Thereafter, the system may transmit a command to a client application on the user's device that causes the application to display an interface for performing the predicted future action. For example, the system may have stored historical data which shows that a user requests access to a particular resource when the user logs onto the system in regular time intervals. Upon detecting that the user has logged on, that the calculated time period has passed, and the user has not yet requested the particular resource, the system may automatically prompt the user to access the particular resource. In this way, the system allows the user to bypass the manual extraneous steps to access the particular resource, thereby improving the computing efficiency of the servers on which the system is implemented.

The system may further establish relevance scores or classifications for a resource based on the resource's use by users in the system. For instance, the system may track the number of times one resource is linked to or accessed by another resource. The system may further track the number of times a resource was accessed through the recommendations panel. In this way, the system may intelligently increase the relevant scores for resource combinations/suggestions even if such combinations of classifications were not predefined by the system or its administrators. In other words, the system may dynamically adjust its recommendations system to account for unusual or unexpected resource pairings or changes in trends regarding the resources amongst the system's users.

In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users.

The system addresses a number of computer technology-centric challenges as described above. As noted, the system is typically configured to dynamically predict future actions that a user intends to take (e.g., within a client application on the user's device that interacts with the resource management system) by monitoring a user's inputs, attributes, historical data, and the like. By dynamically predicting future actions, the system is then able to prompt the user to complete the predicted action, while avoiding intermediate interactions that the system would have otherwise had with the user. By avoiding these intermediate interactions, the system is able to reduce demands on computer resources. In addition, by dynamically identifying and pooling like data, the system improves the efficiency of the online system by reducing the incidence of wasted computing resources caused by manual searching of relevant resources by the users. In other words, by automatically providing suggestions for resources based on their identified data classification, the system removes the need for the user to strain the system's servers by manually sifting through irrelevant data. Instead, the system intelligently provides the relevant data to the user before such manual searching takes place, thereby increasing computing efficiency. The types of computing resources saved by the foregoing may include, but are not limited to, processing power, memory space, storage space, cache space, electric power, and networking bandwidth.

FIG. 1 is a block diagram illustrating an operating environment 001, in accordance with one embodiment of the present invention. The operating environment may include a plurality of user devices 100 in operative communication with a resource management server 101 over a network 180. The network 180 may also be a global area network (GAN), such as the Internet, a wide area network (WAN), a local area network (LAN), or any other type of network or combination of networks. The network 180 may provide for wireline, wireless, or a combination wireline and wireless communication between devices on the network 180. The user device may be a mobile device such as a smartphone, tablet, or laptop, a personal computing device such as a desktop computer, smart device, single board computer, or a device owned and operated by an entity, such as a computer system terminal located on the entity's premises. The resource management server 101 is responsible for running the resource management application and running its various processes. It should be understood that the resource management server 101 as depicted herein may be embodied in a single server or multiple servers distributed over varying geographic distances.

Generally, the user devices 100 are used to log onto the resource management server 101 over the network 180 to access the online portal. The resource management server 101 may require that authentication credentials are provided by the user device 100. In some embodiments, the authentication credentials may include a username, password, a biometric identifier, a cryptographic key, a token, and the like. The resource management server 101 may further require that more than one authentication credential is provided as parts of a multi-step authentication process. Once the user has been authenticated, the user may log onto the online portal on the resource management server 101 using the user device 100 to access the resources and resource management tools therein.

In some embodiments, the operating environment may further include a third party server 102 which may be in operative communication with the user device 100, the resource management server 101, or both, over the network 180. The third party server 102 may contain data associated with the user which may be accessed by some of the resource management tools run on the resource management server 101. This configuration allows the resource management server 101 to automatically pull the data associated with the user from the third party server 102 in order to run its various processes. For example, the third party server 102 may contain data relating to the user's financial accounts, and the resource management server 101 may provide tools to manage that data. In such an embodiment, the user may provide a second set of authentication credentials associated with the user's financial account to the third party server 102 directly. Alternatively, the user may store the second set of authentication credentials on the resource management server 101, which may then use said authentication credentials to access the data within the third party server 102.

FIG. 2 is a block diagram illustrating the resource management server 101 and the user device 100 in more detail, in accordance with one embodiment of the present invention. The resource management server 101 typically contains a processor 120 communicably coupled to such devices as a communication interface 110 or a communication device 110 and a memory 130. The processor 120, and other processors described herein, typically includes circuitry for implementing communication and/or logic functions of the mobile device 100. For example, the processor 120 may include a digital signal processor device, a microprocessor device, and various analog to digital converters, digital to analog converters, and/or other support circuits.

The resource management server may use the communication interface 110 to communicate with other devices over the network 180. The communication interface 110 as used herein may include an Ethernet interface, an antenna coupled to a transceiver configured to operate on a cellular data or WiFi signal, and/or a near field communication ("NFC") interface.

The resource management server may include a memory 130 operatively coupled to the processor 120. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

Typically, a resource management server application 150 is stored within the memory 130 to implement the functions of the online portal through the processor 120 on the resource management server 101. The resource management server application 150 allows a user 170 to connect to the resource management server 101 through a user device 100, in order to access the resource data therein as well as utilize the resource management tools provided through the online portal. The resource management server application 150 includes the logic code portions to determine the appropriate resource recommendations as well as the code portions to collect usage and historical data from the plurality of users 170 within the system.

The memory 130 may further include a database 140 containing data to be processed and/or manipulated by the resource management server application 150. The database 140 may contain usage and historical data provide by the users 170. The database 140 may also contain data on the various classifications to be used to categorize the resources and the users, on what classifications correspond to which resources, as well as logical links between and amongst the various resources and the users. It should be understood that while the database 140 is depicted as a single unit within a single resource management server in FIG. 3, the database 140 may represent multiple databases implemented across multiple resource management servers 101. It should also be understood that the resource management server application 150 may implemented in a distributed manner amongst a plurality resource management servers 101. The database 140 may also be stored on a separate, distinct memory 130 from the resource management server application 150.

The user device 100 typically also includes a processor 121 operatively coupled to a communication interface 111 and a memory 131. The memory 131 typically stores a resource management client application 151, which causes the processor 121 to display a user interface 160 to the user 170. It should be understood that the display on which the user interface 160 is presented may include an integrated display (e.g. a tablet or smartphone screen) within the user device 100, or an external display device (e.g. a computer monitor or television). The resource management client application 151 establishes a connection with the resource management server application 150 over the network 180 to allow the user 170 to access the various functions of the system. In particular, the resource management client application 151 receives inputs from the user interface 160, which may include such inputs as user authentication credentials, requests to upload resource data, which may include various types of data such as activity data, to the resource management server 101, requests to utilize the resource management tools of the resource management server application 150, and the like.

In a typical embodiment of the invention, the user 170 accesses the resource management client application 151 through the user interface 160. The resource management client application 151 sends a request over the network 180 to establish a communication link with the resource management server 101 through the resource management server application 150. Upon receiving the request, the resource management server application 150 causes the resource management server 101 to send a command to the user device 100 to prompt the user 170 for authentication credentials through the user interface 160. Upon receiving authentication credentials from the user 170, the resource management client application 151 sends the authentication credentials to the resource management server application 150. Upon successful authentication, a communication link between the resource management client application 151 and the resource management server application 150 is established. The user 170 then provides a request to upload resource data to the resource management client application 151, which then sends the resource data to the resource management server application 150. The resource management server application 150 then processes the contents of the resource data, and based on a combination of user inputs, historical data within the database 140, and various types of data found within the resource data, adds classifications or tags to the user 170 and/or the resource data provided by the user. The resource management server application 150 then predicts future actions that the user 170 intends to take within the user interface 160, and prompts the user through a notification to take the intended future action.

The system may store user activity data within the online portal within the database 140. In some embodiments, the resource management server application 150 may cause the processor 120 to periodically query the user device 100 to obtain snapshots of the state of the resource management client application 151. Upon receiving the query, the resource management client application 151 immediately obtain a snapshot of user actions taken within the graphical interface, then send the snapshot to the resource management server 101. In other embodiments, the resource management client application 151 may continuously track user inputs and temporarily store them in the memory 131, then send the history of user inputs to the resource management server 101 upon receiving the query. In other embodiments, the resource management client application 151 may periodically track the user's inputs and push the input data to the resource management server 101 without waiting to receive a query.

Referring now to FIG. 3, a method 003 is provided for dynamically managing resource connectivity. This method 003 may be performed by the system described herein (e.g., by the resource management server 101). As discussed previously, the system typically comprises a communication device 110, a processor 120, and a resource management server application/module 150, stored in memory 130. The memory 130 typically comprises a non-transitory computer readable storage medium having computer-executable instructions, such as the instructions associated with the resource management server application/module 150, which when executed by the processor 120, are configured to cause the processor to perform one or more steps described herein. Moreover, the communication device 110 is typically in operative communication with a plurality of user devices of a plurality of users (e.g., users of the system) over a network, such as the network 180. The plurality of users may comprise a first plurality of users having a resource deficiency, and a second plurality of users having a resource provisioning capability. The embodiments of the invention are illustrated below with respect to a first user of the first plurality of users having a first resource deficiency and a second user of the second plurality of users having a resource provisioning capability. As such, the communication device 110 is typically in communication with a first user device of a first user and a second user device of a second user. The first user device and the second user device may be similar to the user device 100, and may comprise a display device configured for presenting a interfaces of a client application (for example, the resource management client application 151).

As used herein, a "resource transfer" or "transaction", may refer to any activities or communication between a user and the entity, activities or communication between multiple entities/users, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution.

A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" refers to any activity initiated between a user and a resource entity such as a merchant, between the user and the financial instruction, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like.

Initially, at block 305, the system may identify a plurality of resource deficiencies associated with a first plurality of users. As described above the first plurality of users are a subset of the plurality of users that the system is in operative communication with. Furthermore, the system is configured to identify resource deficiency parameter(s) associated with each resource deficiency. The resource deficiency parameters are typically associated with the attributes or properties of the resource deficiency. For instance, the resource deficiency parameter may comprise a classification type of the resource deficiency (for example, a service type, a product type, and the like), resource quantity parameters (for example, product quantity, service hours requires, number of personnel, and the like), time parameters (for example, time period of the resource deficiency, expected future time period of the deficiency, predetermined time before which resource provision/surplus transfer is required, and the like), location parameters (for example, location of the service, delivery location of the product, and the like), user details, resource amount or expense/cost details, and the like.

In some embodiments, in order to identify subset or the first plurality of users that have resource deficiencies and the resource deficiency parameters, the system may analyze various types of data related to the users. For example, the system may analyze the users' transaction history, usage of the system (e.g., exchanging resources through the system), business data, user classifications, resource classifications, and the like. This information may be obtained from the user (e.g., from a user device), previously stored on the resource management server 101, obtained from another entity system, and/or obtained from a third party.

In some embodiments, the system may analyze resources transfers or activities of the plurality of users (e.g., users of the system) to identify the plurality of resource deficiencies and the resource deficiency parameters associated with the first plurality of users. Information regarding the resource transfers of the subset of users may be obtained from the users (e.g., from a client application operating on a user device of a user), from another entity system (e.g., an entity transaction server), or from a third party system. The resource management server 101 may establish a secure communication channel with these other systems in order to obtain real-time resource transfer information.

For example, the first user may have a lower than average amount of funds in an account of the first user due a period of lower than average income, which may lead the system to determine that the user has a resource deficiency. Here, the system may further determine the resource deficiency parameters to be the required amount of funds to attain average income value, desired time period of the resource transfer, and the like. By way of further example, the first user may have a lower than average inventory of a particular good that the first user regularly buys, sells, or uses, which may lead the system to determine that the user has a resource deficiency of the particular inventory product. As another example, the first user may not have yet performed an activity or engaged a service for the activity that the user typically performs/engages during the time period. As yet another example, the system may determine that the first user is likely to require certain goods/services based on analyzing activities or transactions of the user. For instance, based on ascertaining that the first user purchased or placed an order for a product that requires installation, the system may determine that the first user has a resource deficiency of the installation service. Here, the system may determine resource deficiency parameters to be a service type, a service scale, equipment required, expected service hours, desired start time (for example, determined based on analyzing the user's schedule), service location, and the like.

In some instances, the amount of the deficiency is typically the amount of the particular resource of the resource deficiency, when transferred to the user, renders the particular user to its desired, mean/average, and/or required levels.

In some embodiments, in order to identify subset or the first plurality of users that have resource deficiencies and the resource deficiency parameters, the system may monitor, in real-time, over a secure communication channel, actions of the first user within the client application or the user device in general, as discussed previously. Specifically, the system is typically configured to monitor the actions of the first user within the client application by tracking the first user's mouse cursor position, touchscreen inputs, key strokes, time taken for accessing or time spent on a particular interface of the client application. For example, based on ascertaining that the user has spent a time greater than a predetermine amount of time on actively on a entity interface associated with first service/product, or based on determining that a predetermined number of the user's searches are associated with the first service/product, the system may determine that the user may have a resource deficiency associated with the product/service. As such, based on monitoring the actions of the first user within the client application, the system may predict the first resource deficiency of the first user.

In response to identifying the resource deficiency associated with the user, using any combination of the methods described above, the system typically transmits, over the secure communication channel, a command to the client application. This command is configured to cause the client application to display a resource deficiency interface. The resource deficiency interface typically comprises presentation of the identified resource deficiency and/or determined resource deficiency parameters. The first user may then provide a user input approving/confirming the identified resource deficiency, modifying the identified resource deficiency and/or the determined resource deficiency parameters, providing additional the resource deficiency parameters, and/or the like. This user input may be received at the system via the secure communication channel. As used herein, causing presentation of a particular interface on the user device refers to the system transmitting a command to the client application, wherein the command is configured to cause the client application to display the particular interface on a display device of the user device.

In some embodiments, identifying subset or the first plurality of users that have resource deficiencies comprises receiving, via the secure communication channel, the resource deficiency and the resource deficiency parameters from the first user. In some instances, the user may provide the user input via the resource deficiency interface of the client application. The client application, may then transmit a response signal to the system indicating the user input.

Based on receiving the user input of the resource deficiency and the resource deficiency parameters, and/or a confirmation input, or automatically, in response to identifying the resource deficiency and the resource deficiency parameters, the system constructs a first resource deficiency object for the resource deficiency of the second user, as will be described below. In some embodiments, the resource deficiency interface is configured to present the constructed the first resource deficiency object associated with the first resource deficiency, receive user input regarding the resource deficiency object and the like.

Once a subset of users of the plurality of users, i.e., the first plurality of users having a plurality of resource deficiencies has been identified, at block 310, the system constructs a resource deficiency object repository comprising a plurality of resource deficiency objects associated with the plurality of resource deficiencies. Typically, the system constructs for each of the plurality of resource deficiencies, a resource deficiency object. The resource deficiency object is constructed based on at least the resource deficiency parameter such that the resource deficiency object may be selected, accessed, or searched within the resource deficiency object repository based on the resource parameter.

In some embodiments, constructing the resource deficiency object repository comprises determining, by the system, a query pointer path for each of the plurality of resource deficiency objects. In some instances, the query pointer path is constructed based on the resource deficiency parameters of the resource deficiency. The system then constructs, automatically, an object repository code. The object repository code is constructed in a predetermined programming or technical language and encoded in a test object file. The object repository code typically comprises the plurality of resource deficiency objects as nodes in a logical structure of the object repository code. The object repository code is created such that query pointer paths of the one or more test objects are configured for selection of the nodes within the test object file. For example, the object repository code may be encoded in an Extensible Markup Language (XML) format in the test object file.

In some embodiments, constructing the objects comprises constructing, for each of the plurality of resource deficiency objects, a predetermined data structure at a predetermined memory location, such that the data structure may be referenced based on the resource deficiency attributes. In some embodiments, constructing the objects comprises constructing, for each of the plurality of resource deficiency objects, a record having the resource deficiency parameters as fields or attributes.

In some embodiments, constructing the objects comprises constructing, for each, for each of the plurality of resource deficiency objects, a graphical element associated with the resource deficiency. The graphical elements are configured for presentation on a user interface of the client application, and may be presented based on transmitting a command to the client application for causing the client application to display the graphical element suitably within the interface. Typically, the graphical element is tagged or referenced based on at least the associated resource deficiency parameters. In some instances, the graphical element comprises a visual presentation of the associated resource deficiency parameters. In some embodiments, the resource deficiency object repository comprising the plurality of graphical elements may be presented on the user interface, based on transmitting a command to the client application. Here, the plurality of graphical elements are typically configured such that, one or more graphical elements may be searched, selected or ordered based on the resource deficiency parameters.

In some embodiments, the graphical elements comprise display elements for displaying text, images and the like. In some embodiments, the graphical elements comprise graphical manipulation tools and control elements like checklists, tables, drop down lists, list boxes, pop-up menus, widgets, radio buttons, toggle switches, toolbars, text boxes and the like to enable user selection of parameters, navigation through the interface, user input of one or more parameters, and display of confirmation or output. In some embodiments, the graphical elements are presented in the resource deficiency interface, described above.

At block 315, a resource provisioning capability associated with the second user is determined by the system. As used herein, the resource provisioning capability of the user may refer to current resource surpluses or resource availability for transfer of the second user, or future resource capabilities of the second user, such as expected or determined resource surpluses or resource availability for transfer at a predetermined time in the future. For example, a resource provisioning capability of the second user may refer to current surplus products or services available for transfer/hire and expected future availability of products or services. Furthermore, the resource provisioning capability associated with the second user may be determined by the system based on past resource surpluses or availabilities of the user, past resource transfers of the user, expected future resource surpluses, based on receiving an indication from the second user regarding a current/future resource surplus, and the like. Furthermore, the system allows the second user to post descriptions of the resource provisioning capability.

Typically, the resource provisioning capability of the second user is associated with one or more resource provisioning parameters, which are typically similar to the resource provisioning parameter. Moreover, the system is configured to identify resource provisioning parameter(s) associated with the resource provisioning capability, in some instances. The resource provisioning parameters are typically associated with the attributes or properties of the resource provisioning capability of the second user. For instance, the resource provisioning parameters may comprise a classification type of the available resources (for example, a service type, a product type, a skill type, and the like), resource quantity availability parameters (for example, product quantity, service hours requires, number of personnel, and the like), time parameters (for example, time period of the resource availability, and the like), location parameters (for example, location of the service availability, available delivery locations of the product, and the like), user details, resource amount or expense/cost details, and the like.

In some embodiments, in order to identify the second user that has a resource provisioning capability, the system may analyze various types of data related to the users (i.e., the plurality of users), in a manner similar to the resource deficiencies described above. For example, the system may analyze the users' transaction history, usage of the system (e.g., exchanging resources through the system), business data, user classifications, resource classifications, and the like. This information may be obtained from the user (e.g., from a user device), previously stored on the resource management server 101, obtained from another entity system, and/or obtained from a third party.

In some embodiments, the system may analyze resources transfers or activities of the second user and/or monitor in real-time, over a secure communication channel, actions of the second user within the client application or the second user device, as discussed previously, to identify the second user or the second plurality users having resource provisioning capabilities. Information regarding the resource transfers of the subset of users may be obtained from the users (e.g., from a client application operating on a user device of a user), from another entity system (e.g., an entity transaction server), or from a third party system. The resource management server 101 may establish a secure communication channel with these other systems in order to obtain real-time resource transfer information.

In some embodiments, the resource provisioning capability of the second user is determined based on one or more past resource capabilities, one or more past transactions or activities, and/or previously created resource provisioning objects associated with the second user, as will be described below. For example, the second user may have a higher than average amount of funds in an account of the second user due a period of higher than average income. By way of further example, the second user may have a higher than average inventory of a particular good that the second user regularly buys or sells. As another example, the second user may have previously indicated to the system regarding availability of a first commercial service. As yet another example, the system may identify based on analyzing a user profile or user activities/transactions that the second user has previously rendered a service B to another user. Here, the system may determine that the second user has the resource provisioning capability of service B. The system may then identify, the first commercial service as a resource provisioning capability of the second user.

In some embodiments, the system may transmit, over the secure communication channel, a command to the client application. This command is configured to cause the client application to display a resource provisioning interface to the second user. The resource deficiency interface may comprise presentation of the identified resource provisioning capability and/or determined resource provisioning parameters. The second user may then provide a user input approving/confirming the identified resource provisioning capability, modifying the identified resource provisioning capability and/or the determined resource provisioning parameters, providing additional the resource provisioning parameters, and/or the like. Furthermore, the resource provisioning capability of the second user may also be determined based on receiving an input from the second user regarding the resource provisioning capability and/or the resource provisioning parameters, for example, based on receiving an indication of the user input from the client application via the secure channel. For example, the second user may post a resource availability, a résumé of skills, and the like on the resource provisioning interface, along with description of the resource provisioning capabilities, such as descriptions of goods and services offered, and the like. In some embodiments, the description of the resource provisioning capabilities may be the resource provisioning parameters of the resource provisioning capability of the second user.

Based on this determining the resource provisioning capability associated with the second user, at block 320, the system constructs a resource provisioning object associated with the resource provisioning capability of the second user. Typically, the resource provisioning object associated with the resource provisioning capability of the second user, is constructed based on at least the resource provisioning parameter. In some instances, the resource provisioning objects are substantially similar to the resource deficiency objects described previously. In this way, the system may create an electronic compendium or résumé of products or services offered for the second user, and/or past products, services or tasks performed by the second user. In some instances, the system incorporates the resource provisioning capability posted by the second user into the resource provisioning object, and the electronic compendium. Typically, the electronic compendium is accessible by a plurality of users, such as the users with resource deficiencies who seek resource transfers or users who were recipients of the past products, services or tasks offered by the second user who wish to post reviews of the products or services.

Furthermore, the system may update or modify the resource provisioning object, either, automatically and in real time, based on identifying additional resource provisioning capabilities, or in response to a user input. For example, the system may identify a second resource provisioning capability and/or a corresponding a second resource provisioning parameter associated with the second user. In response, the system may automatically modify the resource provisioning object associated of the second user by augmenting the resource provisioning object with the second resource provisioning parameter. In this manner, the system facilitates a dynamically updated electronic compendium for the second user.

Moreover, in some embodiments, the system may aggregate the electronic compendiums of a group of users to create a comprehensive electronic database of resource provisioning capability. In this regard, the system is configured to construct a resource provisioning object repository comprising a plurality of resource provisioning objects associated with a plurality of resource provisioning capabilities of a group of users. The resource provisioning object repository is substantially similar to the resource deficiency object repository described previously.

Next, at block 325, the system determines that the resource provisioning capability associated with the second user matches a first resource deficiency associated with the first user. In this regard, the system typically parses the resource deficiency object repository to identify a first resource deficiency object associated with the first user having a first resource deficiency parameter that corresponds to the resource provisioning parameter of the second user. Typically, the system compares the resource provisioning parameters of the resource provisioning object to the resource deficiency parameters of the resource deficiency objects to identify matches.

Based on determining that the resource provisioning capability associated with the second user matches a first resource deficiency associated with the first user, at block 330, the system establishes, automatically, a resource connection between the first resource deficiency object and the resource provisioning object. Furthermore, in some instances, the system may append the first resource deficiency object with matched the resource provisioning object, indicating the resource connection. In some embodiments, establishing the resource connection further comprises notifying the first user, via the first user device of the first user, regarding the resource connection, for example, via the notifications panel of the graphical user interface of the client application, described previously. In some embodiments, the transmitting the notification comprises, generating, automatically, a bid or an invoice for the resource provisioning capability of the second user, and transmitting the bid to the first user. In some embodiments, the system may automatically post bids for the resource deficiencies of the first user, on behalf of the second user with resource provisioning capabilities.

In some embodiments, establishing the resource connection further comprises receiving authorization from the user to establish the resource connection. Here, the system may transmit, over the secure communication channel, a second command to the client application. The second command is configured to cause the client application to present an augmented interface on the first user device, wherein the augmented interface comprises the first graphical element augmented with a second graphical element associated with the resource provisioning object. Also, the second graphical element typically comprises a presentation of the resource provisioning parameter on the first interface. Next, the system may receive an indication from the first user accepting the resource connection. In this regard, the system may monitor, in real-time, over the secure communication channel, to identify a selection of the second graphical element by the user within the client application.

In this way, the system automatically connects users with resource deficiencies with other users having corresponding source provisioning capabilities, by automatically posting the resource provisioning capabilities of a second user to a first user requiring the provisioning capabilities.

Next, at block 335, resources corresponding to the resource provisioning capability associated with the second user are typically transferred to the first user. For example, if the first user has a deficiency of a first number of product A, the system may initiate transportation of the first number of product A from the second user to a location associated with the first user.

In some embodiments, after completion of the resource transfer, the system facilitates the first user to post reviews associated with the resources provided by the second user. In this regard, the system may establish a secure communication channel with a client application stored on the first user device of the first user. Next, the system may transmit, over the secure communication channel, a command to the client application. The command is configured to cause the client application to present a first interface on the first user device comprising a graphical element associated with the resource provisioning object. This first user interface may be associated with the electronic compendium of the second user. The resource provisioning object typically comprises the resource provisioning parameter and the resource connection. In response to receiving, over the secure communication channel, a feedback input from the first user, the system may modify the resource provisioning object of the second user by augmenting the resource provisioning object with the feedback input from the first user. In this way, the system is configured to dynamically augment the electronic compendium of the first user with the feedback receiving for goods/services rendered.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

The invention claimed is:

1. A computerized system for dynamically managing resource connectivity, comprising:
 a communication device in communication with a plurality of user devices of a plurality of users over a network, the plurality of user devices comprising a first user device of a first user and a second user device of a second user;
 a processor;
 a memory; and
 a resource management module stored in the memory, executable by the processor and configured for:
  identifying a plurality of resource deficiencies associated with a first plurality of users of the plurality of users, wherein each resource deficiency of the plurality of resource deficiencies is associated with a resource deficiency parameter;
  constructing a resource deficiency object repository comprising a plurality of resource deficiency objects associated with the plurality of resource deficiencies, wherein constructing the resource deficiency object repository comprises:
   constructing for each of the plurality of resource deficiencies, a resource deficiency object based on at least the resource deficiency parameter, wherein the resource deficiency object is configured for selection within the resource deficiency object repository based on the resource deficiency parameter;
  determining a resource provisioning capability associated with the second user, wherein the resource provisioning capability of the second user is associated with a resource provisioning parameter;
  constructing a resource provisioning object associated with the resource provisioning capability of the second user based on at least the resource provisioning parameter;
  parsing the resource deficiency object repository to identify a first resource deficiency object of the plurality of resource deficiency objects having a first resource deficiency parameter that corresponds to the resource provisioning parameter, wherein the first resource deficiency object is associated with a first resource deficiency of the first user, the first plurality of users comprising the first user;
  determining that the resource provisioning capability associated with the second user matches the first resource deficiency associated with the first user, based on identifying that the first resource deficiency parameter corresponds to the resource provisioning parameter;

| Docket Number | U.S. patent application Ser. No. | Title | Filed On |
| --- | --- | --- | --- |
| 7605US1.014033.2948 | To be assigned | COMPUTERIZED SYSTEM FOR IDENTIFYING AND REDISTRIBUTING COMPLEMENTARY RESOURCES | Concurrently herewith |
| 7606US1.014033.2949 | To be assigned | COMPUTING SYSTEM FOR IDENTIFYING, POOLING, AND MANAGING RESOURCES | Concurrently herewith |
| 7607US1.014033.2950 | To be assigned | SYSTEM FOR IDENTIFICATION AND INTEGRATION OF LIKE RESOURCES AND CONFIGURING RESOURCES FOR COMMON USE | Concurrently herewith | based on determining that the resource provisioning capability associated with the second user matches a first resource deficiency of the first user, establishing, automatically, a resource connection between the first resource deficiency object and the resource provisioning object, comprising appending the first resource deficiency object with the resource provisioning object, wherein establishing the resource connection further comprises notifying the first user, via the first user device of the first user, regarding the resource connection;

receiving an indication from the first user, via the first user device, accepting the resource connection; and initiating transfer of resources corresponding to the resource provisioning capability associated with the second user to the first user.

2. The computerized system according to claim 1, wherein the resource management module is configured for:

establishing a secure communication channel with a client application stored on the first user device of the first user; and transmitting, over the secure communication channel, a first command to the client application, wherein the first command is configured to cause the client application to present a first interface on the first user device, wherein the first interface comprises a first graphical element associated with the first resource deficiency object on the first interface.

3. The computerized system according to claim 2, wherein establishing the resource connection further comprises:

transmitting, over the secure communication channel, a second command to the client application, wherein the second command is configured to cause the client application to present an augmented interface on the first user device, wherein the augmented interface comprises the first graphical element augmented with a second graphical element associated with the resource provisioning object, wherein the second graphical element comprises a presentation of the resource provisioning parameter on the first interface;

wherein receiving an indication from the first user accepting the resource connection comprises monitoring action of user within the client application, in real-time, over the secure communication channel, to identify a selection of the second graphical element by the user within the client application.

4. The computerized system according to claim 1, wherein the resource management module is configured for:

establishing a secure communication channel with a client application stored on the first user device of the first user;

transmitting, over the secure communication channel, a command to the client application, wherein the command is configured to cause the client application to present a first interface on the first user device, wherein the first user interface comprises a graphical element associated with the resource provisioning object comprising the resource provisioning parameter and the resource connection;

receiving, over the secure communication channel, a feedback input from the first user;

modifying the resource provisioning object associated with the resource provisioning capability of the second user by augmenting the resource provisioning object with the feedback input from the first user.

5. The computerized system according to claim 1, wherein the resource management module is configured for:

determining a second resource provisioning capability associated with the second user, wherein the second resource provisioning capability of the second user is associated with a second resource provisioning parameter;

modifying the resource provisioning object associated with the resource provisioning capability of the second user by augmenting the resource provisioning object with the second resource provisioning parameter.

6. The computerized system according to claim 1, wherein the resource management module is configured for:

monitoring, in real-time, over a secure communication channel, actions of the first user within a client application;

based on monitoring the actions of the first user within the client application, predicting the first resource deficiency of the first user; and in response to predicting the first resource deficiency, transmitting, over the secure communication channel, a command to the client application, wherein the command is configured to cause the client application to display an interface for constructing the first resource deficiency object associated with the first resource deficiency.

7. The computerized system according to claim 6, wherein monitoring the actions of the first user within the client application comprises tracking the first user's mouse cursor position, touchscreen inputs, key strokes, or time accessing a particular interface of the client application.

8. The computerized system according to claim 1, wherein the resource provisioning capability of the second user is determined based on one or more past resource provisioning objects associated with the second user.

9. The computerized system according to claim 1, wherein the resource provisioning capability of the second user is determined based on receiving an input from the second user regarding the resource provisioning capability.

10. The computerized system according to claim 1, wherein the resource management module is configured for constructing a resource provisioning object repository comprising a plurality of resource provisioning objects associated with a plurality of resource provisioning capabilities, wherein the plurality of resource provisioning objects comprises the resource provisioning object associated with associated with the resource provisioning capability of the second user.

11. A computer program product for dynamically managing resource connectivity, comprising a non-transitory computer-readable storage medium having computer-executable instructions for:

identifying a plurality of resource deficiencies associated with a first plurality of users, wherein each resource deficiency of the plurality of resource deficiencies is associated with a resource deficiency parameter;

constructing a resource deficiency object repository comprising a plurality of resource deficiency objects associated with the plurality of resource deficiencies, wherein constructing the resource deficiency object repository comprises:

constructing for each of the plurality of resource deficiencies, a resource deficiency object based on at least the resource deficiency parameter, wherein the resource deficiency object is configured for selection within the resource deficiency object repository based on the resource deficiency parameter;

determining a resource provisioning capability associated with a second user, wherein the resource provisioning capability of the second user is associated with a resource provisioning parameter;

constructing a resource provisioning object associated with the resource provisioning capability of the second user based on at least the resource provisioning parameter;

parsing the resource deficiency object repository to identify a first resource deficiency object of the plurality of resource deficiency objects having a first resource deficiency parameter that corresponds to the resource provisioning parameter, wherein the first resource deficiency object is associated with a first resource deficiency of a first user, the first plurality of users comprising the first user;

determining that the resource provisioning capability associated with the second user matches the first resource deficiency associated with the first user, based on identifying that the first resource deficiency parameter corresponds to the resource provisioning parameter;

based on determining that the resource provisioning capability associated with the second user matches a first resource deficiency of the first user, establishing, automatically, a resource connection between the first resource deficiency object and the resource provisioning object, comprising appending the first resource deficiency object with the resource provisioning object, wherein establishing the resource connection further comprises notifying the first user, via a first user device of the first user, regarding the resource connection;

receiving an indication from the first user, via the first user device, accepting the resource connection; and initiating transfer of resources corresponding to the resource provisioning capability associated with the second user to the first user.

12. The computer program product according to claim 11, wherein the non-transitory computer-readable storage medium has computer-executable instructions for:

establishing a secure communication channel with a client application stored on the first user device of the first user; and transmitting, over the secure communication channel, a first command to the client application, wherein the first command is configured to cause the client application to present a first interface on the first user device, wherein the first interface comprises a first graphical element associated with the first resource deficiency object on the first interface.

13. The computer program product according to claim 12, wherein establishing the resource connection further comprises:

transmitting, over the secure communication channel, a second command to the client application, wherein the second command is configured to cause the client application to present an augmented interface on the first user device, wherein the augmented interface comprises the first graphical element augmented with a second graphical element associated with the resource provisioning object, wherein the second graphical element comprises a presentation of the resource provisioning parameter on the first interface;

wherein receiving an indication from the first user accepting the resource connection comprises monitoring action of user within the client application, in real-time, over the secure communication channel, to identify a selection of the second graphical element by the user within the client application.

14. The computer program product according to claim 11, wherein the non-transitory computer-readable storage medium has computer-executable instructions for:

establishing a secure communication channel with a client application stored on the first user device of the first user;

transmitting, over the secure communication channel, a command to the client application, wherein the command is configured to cause the client application to present a first interface on the first user device, wherein the first user interface comprises a graphical element associated with the resource provisioning object comprising the resource provisioning parameter and the resource connection;

receiving, over the secure communication channel, a feedback input from the first user;

modifying the resource provisioning object associated with the resource provisioning capability of the second user by augmenting the resource provisioning object with the feedback input from the first user.

15. The computer program product according to claim 11, wherein the non-transitory computer-readable storage medium has computer-executable instructions for:

determining a second resource provisioning capability associated with the second user, wherein the second resource provisioning capability of the second user is associated with a second resource provisioning parameter;

modifying the resource provisioning object associated with the resource provisioning capability of the second user by augmenting the resource provisioning object with the second resource provisioning parameter.

16. The computer program product according to claim 11, wherein the non-transitory computer-readable storage medium has computer-executable instructions for:

monitoring, in real-time, over a secure communication channel, actions of the first user within a client application;

based on monitoring the actions of the first user within the client application, predicting the first resource deficiency of the first user; and in response to predicting the first resource deficiency, transmitting, over the secure communication channel, a command to the client application, wherein the command is configured to cause the client application to display an interface for constructing the first resource deficiency object associated with the first resource deficiency.

17. The computer program product according to claim 16, wherein monitoring the actions of the first user within the client application comprises tracking the first user's mouse cursor position, touchscreen inputs, key strokes, or time accessing a particular interface of the client application.

18. A computerized method of identifying and redistributing complementary resources for dynamically managing resource connectivity, comprising:

identifying a plurality of resource deficiencies associated with a first plurality of users, wherein each resource deficiency of the plurality of resource deficiencies is associated with a resource deficiency parameter;

constructing a resource deficiency object repository comprising a plurality of resource deficiency objects associated with the plurality of resource deficiencies, wherein constructing the resource deficiency object repository comprises:

constructing for each of the plurality of resource deficiencies, a resource deficiency object based on at least the resource deficiency parameter, wherein the resource deficiency object is configured for selection within the resource deficiency object repository based on the resource deficiency parameter;

determining a resource provisioning capability associated with a second user, wherein the resource provisioning capability of the second user is associated with a resource provisioning parameter;

constructing a resource provisioning object associated with the resource provisioning capability of the second user based on at least the resource provisioning parameter;

parsing the resource deficiency object repository to identify a first resource deficiency object of the plurality of resource deficiency objects having a first resource deficiency parameter that corresponds to the resource provisioning parameter, wherein the first resource deficiency object is associated with a first resource deficiency of a first user, the first plurality of users comprising the first user;

determining that the resource provisioning capability associated with the second user matches the first resource deficiency associated with the first user, based on identifying that the first resource deficiency parameter corresponds to the resource provisioning parameter;

based on determining that the resource provisioning capability associated with the second user matches a first resource deficiency of the first user, establishing, automatically, a resource connection between the first resource deficiency object and the resource provisioning object, comprising appending the first resource deficiency object with the resource provisioning object, wherein establishing the resource connection further comprises notifying the first user, via a first user device of the first user, regarding the resource connection;

receiving an indication from the first user, via the first user device, accepting the resource connection; and initiating transfer of resources corresponding to the resource provisioning capability associated with the second user to the first user.

19. The method according to claim 18, comprising:

establishing a secure communication channel with a client application stored on the first user device of the first user; and transmitting, over the secure communication channel, a first command to the client application, wherein the first command is configured to cause the client application to present a first interface on the first user device, wherein the first interface comprises a first graphical element associated with the first resource deficiency object on the first interface.

20. The method according to claim 19, wherein establishing the resource connection further comprises:

transmitting, over the secure communication channel, a second command to the client application, wherein the second command is configured to cause the client application to present an augmented interface on the first user device, wherein the augmented interface comprises the first graphical element augmented with a second graphical element associated with the resource provisioning object, wherein the second graphical element comprises a presentation of the resource provisioning parameter on the first interface;

wherein receiving an indication from the first user accepting the resource connection comprises monitoring action of user within the client application, in real-time, over the secure communication channel, to identify a selection of the second graphical element by the user within the client application.

* * * * *